United States Patent
Ardpru et al.

(10) Patent No.: US 12,297,026 B2
(45) Date of Patent: May 13, 2025

(54) PACKAGE CAPABLE OF RELEASING PRESSURE

(71) Applicant: SCG Packaging Public Company Limited, Bangkok (TH)

(72) Inventors: Ittiporn Ardpru, Chonburi (TH); Juthamas Mahajaroensiri, Bangkok (TH); Buncherd Ngamnawakul, Bangkok (TH); Adisak Vorakunpinij, Nonthaburi (TH)

(73) Assignee: SCG Packaging Public Company Limited, Bangkok (TH)

( * ) Notice: Subject to any disclaimer, the term of this patent is extended or adjusted under 35 U.S.C. 154(b) by 0 days.

(21) Appl. No.: 17/259,862

(22) PCT Filed: Jul. 19, 2019

(86) PCT No.: PCT/TH2019/000023
§ 371 (c)(1),
(2) Date: Jan. 12, 2021

(87) PCT Pub. No.: WO2020/022965
PCT Pub. Date: Jan. 30, 2020

(65) Prior Publication Data
US 2021/0309434 A1     Oct. 7, 2021

(30) Foreign Application Priority Data
Jul. 24, 2018    (TH) ............................... 1801004382

(51) Int. Cl.
*B65D 77/22*     (2006.01)
*B32B 1/00*     (2006.01)
(Continued)

(52) U.S. Cl.
CPC .............. *B65D 77/225* (2013.01); *B32B 1/00* (2013.01); *B32B 3/30* (2013.01); *B32B 27/08* (2013.01);
(Continued)

(58) Field of Classification Search
CPC .............. B65D 77/225; B65D 81/3461; B65D 81/3453; B65D 2205/00; B65D 33/01;
(Continued)

(56) References Cited

U.S. PATENT DOCUMENTS

2003/0123758 A1   7/2003   Mita et al.
2010/0025392 A1   2/2010   Nishi et al.
2016/0152399 A1   6/2016   Inagaki et al.

FOREIGN PATENT DOCUMENTS

JP      4524884 B2    8/2010

OTHER PUBLICATIONS

PCT International Search Report from priority application PCT/TH2019/000023; dated Oct. 15, 2019; 3 pages.

*Primary Examiner* — James C Yager
(74) *Attorney, Agent, or Firm* — Adams & Reese LLP; John Henry Scott, III

(57) ABSTRACT

The present invention relates to a package capable of releasing pressure formed therein. Said packaging comprises a container portion which is formed for accommodating product, and a flexible film part comprising at least one pressure-releasing design on an external surface of said part, characterized in that said pressure-releasing design comprises a score of at least two identical or different patterns combined together such that no less than three intersections of the patterns are formed and at least one said pattern is a closed-shape pattern. Moreover, the present invention relates to the pressure-releasing design for a flexible film, characterized in that said pressure-releasing design com- (Continued)

prises a mark of at least two identical or different patterns combined together such that no less than three intersections of the patterns are formed and at least one said pattern is a closed-shape pattern.

50 Claims, 4 Drawing Sheets

(51) Int. Cl.
    *B32B 3/30*          (2006.01)
    *B32B 27/08*        (2006.01)
    *B32B 27/32*        (2006.01)
    *B32B 27/34*        (2006.01)
    *B65D 81/34*        (2006.01)

(52) U.S. Cl.
    CPC .............. *B32B 27/32* (2013.01); *B32B 27/34* (2013.01); *B65D 81/3461* (2013.01); *B32B 2250/02* (2013.01); *B32B 2250/24* (2013.01); *B32B 2307/31* (2013.01); *B32B 2307/518* (2013.01); *B32B 2439/46* (2013.01); *B32B 2439/70* (2013.01)

(58) Field of Classification Search
    CPC .. B65D 81/34; B32B 1/00; B32B 3/30; B32B 27/08; B32B 27/32; B32B 27/34; B32B 2250/24; B32B 2307/31; B32B 2307/518; B32B 2439/46; B32B 2439/70; B32B 2307/546; B32B 27/36; B32B 2307/732; B32B 3/26
    See application file for complete search history.

| Pressure-releasing design | Reference of intersection position | Number of pattern intersections | Number of intersections forming pressure-releasing points |
|---|---|---|---|
| Design 4.4 |  | 5 | 4 |
| Design 4.5 |  | 6 | 3 |
| Design 4.8 |  | 6 | 1 to 6 |

PACKAGE CAPABLE OF RELEASING PRESSURE

TECHNICAL FIELD

Engineering related to a package capable of releasing pressure

BACKGROUND OF THE INVENTION

Special packages such as a hermetically sealed food package that can be frozen or chilled and heated later in a microwave oven which can be subjected to disinfection by pasteurization or sterilization is currently gaining popularity. However, since it is a hermetically sealed package, it requires pre-opening, cutting or piercing before heating in the microwave oven so that the pressure and steam generated inside the package are released to the outside. Such action causes the food inside to lose water and nutritive value which makes it look unappetizing as well as causing inconvenience for users.

Therefore, there is an effort to develop a package capable of automatically releasing pressure or steam formed therein by using various techniques such as the use of valve, which will be mounted to the package after it is perforated. This requires an adjustment to the machine used in the production process to attach the valve which results in higher production costs. In making the weakened seal area to easily open by coating with chemicals or by using a peelable tape to block the sealing mark of the package, the sealing mark region will split, creating a pressure and steam releasing point upon formation of the pressure inside the package. However, by using such method, there is a chance that the food or water will spill out from the package and stain the microwave oven because the size of the pressure and steam releasing point is usually large.

Another technique developed for using with a film package to automatically release pressure and steam is the use of laser power to reduce the thickness in some designed regions of the surface of the outer layer film by perforation to form a line, hole or various designs. When the food is heated and the high-pressure steam is formed, the laser-perforated score will be pushed and torn apart. Such method is easy to perform and requires lower production costs than the aforementioned method.

Examples of the documents disclosing a package subjected to a laser application to create a pressure-releasing design are as follows:

US patent publication no. US2015210463 A1 discloses a laminated film package including an inner layer film made of thermoplastic resin, which can be heat-sealed, and laminated to an outer layer film containing a fragile processed portion made by a laser to remove some part of the outer layer film. The laser scoring may be in different patterns such as a straight line with a width of 150 μm and a length of 40 mm. The fragile processed portion has Young's modulus of less than 2.0 GPa. When the pressure is generated inside the package while heating, many small ventilation holes will be formed in the fragile processed portion.

U.S. Pat. No. 9,505,543 B2 discloses a making of a hermetically sealed package such as a freezable and microwaveable package with food products contained therein. Such package has a pressure releasing system formed by $CO_2$ laser, which may be in a pattern of a straight line or other patterns such as circle, ellipse, triangle or square, etc. The laser pattern span that is from 1% to 50% of the size of the inner region span with the film thickness remained from the laser application of about 5-25 μm.

US patent publication no. US2008260917 A1 discloses a heat-sealable, composite film comprising a substrate layer, which is a polymeric substrate layer having a first surface and a second surface disposed on the substrate layer to form a barrier layer. The substrate layer has perforations for releasing pressure with a diameter of about 0.05-1.5 mm. This perforations may be made using a laser, hot needle or gas flame perforation. The perforations disclosed in this document has, for example, a V shape, U shape, T shape, I shape, and X shape, etc.

However, the pressure-releasing designs made by using a laser disclosed in the above documents still have some disadvantages. For example, in case of closed-shape laser designs such as a circle, triangle or square, if the number or size of the laser score is too small, the pressure and steam may not be released in a timely manner, resulting in a delamination of the laminated film, a damage to the package or a contamination of food contained in the package. Moreover, in case of open-shape laser designs such as a V shape, I shape or X shape, there is a chance that an extended tear may occur, i.e. the tearing on the package may be extended from the end of the laser score resulting in the disadvantages mentioned above.

SUMMARY OF THE INVENTION

Therefore, an object of the present invention is to provide a package having a pressure-releasing design which can effectively automatically release the pressure formed therein, i.e. the pressure-releasing point can be formed and the water vapor pressure can be released in a timely manner, the package is not damaged, and the extended tear of the pressure-releasing design does not occur. More particularly, the present invention provides a hermetically sealed package capable of being frozen or chilled and heated later in the microwave oven, being disinfected by pasteurization or sterilization, and being used as a vacuum package with a pressure-releasing design automatically formed upon heating.

Another object of the present invention is to provide a pressure-releasing design for a flexible film for applying to a package, particularly a hermetically sealed package capable of being frozen or chilled and heated later in a microwave oven and being disinfected by pasteurization or sterilization.

The first embodiment of the present invention relates to a package capable of releasing pressure formed therein. Said package comprises a container portion which is formed for accommodating products, and a flexible film part comprising at least one pressure-releasing design on an external surface of said part characterized in that said pressure-releasing design comprises a score of at least two identical or different patterns combined together such that no less than three intersections of the patterns are formed and at least one said pattern is a closed-shape pattern.

The second embodiment of the present invention relates to a pressure-releasing design for a flexible film characterized in that said pressure-releasing design comprises a score of at least two identical or different patterns combined together such that no less than three intersections of the patterns are formed and at least one said pattern is a closed-shape pattern.

A package having a pressure-releasing design according to the present invention can be used easily and conveniently as it can automatically release pressure and steam. The package thus does not require pre-opening, cutting or piercing to create a pressure release opening before heating in the microwave oven. Also, the delamination of the package will not occur in case the package is made of a laminated film. The sealing mark or other regions will not explode. The extended tear of the pressure-releasing design will not occur while the package is being used, e.g. while being heated in the microwave oven. The users can be ensured that the content in the package such as food will retain its nutritive value and cleanliness and that the food inside the package will not be contaminated. Moreover, the food will not lose too much water. Therefore, the food retains its original taste and looks appetizing, e.g. the texture is soft, not dry and hard, like freshly cooked food.

DETAILED DESCRIPTION

Figure 1:
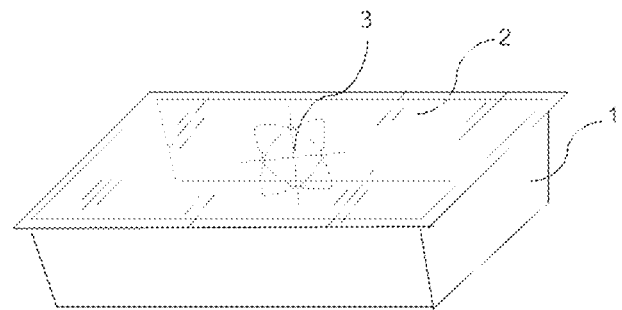
FIG. 1 shows a tray-like package and a sealing portion according to an exemplary embodiment of the present invention.

Any aspects shown herein shall encompass the application to other aspects of the present invention as well, unless otherwise indicated.

Technical and scientific terms used herein have the definitions which are understood by a person having ordinary skill in the art, unless otherwise defined.

Throughout the present invention, the term "about" is used to indicate that any values shown or presented herein may be varied or deviated. Such variation or deviation may be a result of an error of the equipment or method used to determine the values.

The terms "consist(s) of", "comprise(s)", "has/have" and "include(s)" are open-ended verbs. For example, any methods which "consist of", "comprise", "have" or "include" one or more components or steps are not limited only to the one or more components or steps, but also cover the components or steps that are not mentioned.

Any tools, equipment, methods, materials or chemicals mentioned herein, unless otherwise indicated, mean the tools, equipment, methods, materials or chemicals generally used or practiced by a person skilled in the art.

All disclosed components and/or methods and the claims of the present invention are intended to cover the aspects of the invention obtained from any actions, practices, modifications or changes made to the factors without conducting significantly different experiment from the present invention, and to obtain an object with properties, utilities and effects that are similar to the aspects of the present invention according to the opinions of a person having ordinary skill in the art, although not particularly indicated in the claims. Therefore, the object that is equivalent or similar to the aspects of the present invention, including any slight modification or change apparent to a person of ordinary skill in the art, should also be considered to be within the spirit, scope and concept of the present invention.

Definitions

The term "pressure release" as used herein means an aspect of a package which can create an automatic release mechanism of pressure, air and/or steam formed therein upon being heated or receiving any forces which produces pressure inside the package, as well as an aspect of a package that can control the pressure to be in an appropriate range as previously calculated or determined.

The term "flexible film" as used herein means a plastic film which has an expansion property upon being heated and/or receiving forces, including pressure, as well as advantageous properties such as strength and abilities to prevent gas permeation, support printing, and to be heat-sealed. The package is therefore suitable for applications such as in a lamination process to create a flexible package.

The term "closed shape" as used herein means a shape with clear boundary or area which is defined by a straight line and/or a curved line whose ends meet, forming a periphery enclosing a closed area. Examples of closed shape according to the present invention are circle, semi-circle, ellipse, semi-ellipse, pointed-end ellipse, pointed-end semi-ellipse, and polygon such as triangle, square, pentagon, hexagon, etc.

The term "open shape" as used herein means a shape with unclear boundary or area which is defined by a straight line and/or a curved line whose ends do not meet. Examples of open shape according to the present invention are straight line, cross, asterisk, curved line, wavy line, V shape, T shape, etc.

The present invention will now be described in more detail with reference to exemplary experiments and accompanying drawings but is not intended to limit the scope of the invention.

The package according to the present invention can be in different forms as commonly used in the market such as a center-sealed pouch, which is a pouch that is sealed in the center, a three-side sealed pouch, which is a pouch having three sealed sides and one open side for loading a product which will be hermetically sealed after the product is loaded, a stand-up pouch which is similar to the three-side sealed pouch except that the bottom is folded so that the pouch can stand up (herein referred to as "folded portion"), or a package which is a container for accommodating a product and hermetically sealed with a flexible film.

Figure 2:
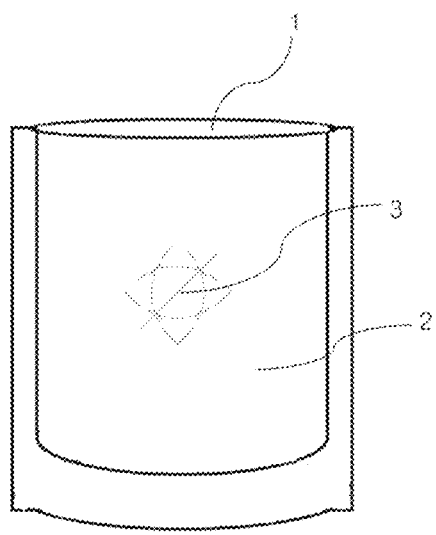
FIG. 2 shows a package which is a stand-up pouch according to an exemplary embodiment of the present invention.
Figure 3:
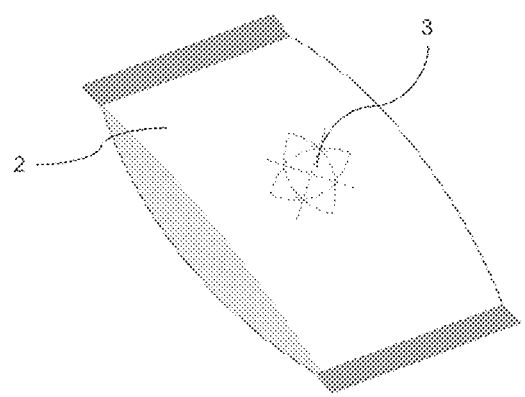
FIG. 3 shows a package which is a center-sealed pouch according to an exemplary embodiment of the present invention.

FIGS. 1-3 show exemplary embodiments of the package according to the present invention.

FIG. 1 shows a package comprising a container portion 1 which is a tray for accommodating products such as food or snack, a sealing portion 2 which is a flexible film part for sealing said container portion 1, and a pressure-releasing design 3 formed on the external surface of said sealing portion 2. In addition to the tray-like embodiment, the container portion 1 can also be formed by molding plastic or any materials to obtain other non-limiting shapes such as a plate, box, bowl or glass, etc.

FIG. 2 shows a package which is a stand-up pouch made of a flexible film for accommodating a product and comprising the pressure-releasing design 3 on the external surface of that pouch.

FIG. 3 shows a package which is a center-sealed pouch made of a flexible film for accommodating a product and sealed in the center and comprises the pressure-releasing design 3 on the external surface of that pouch.

Figure 4:
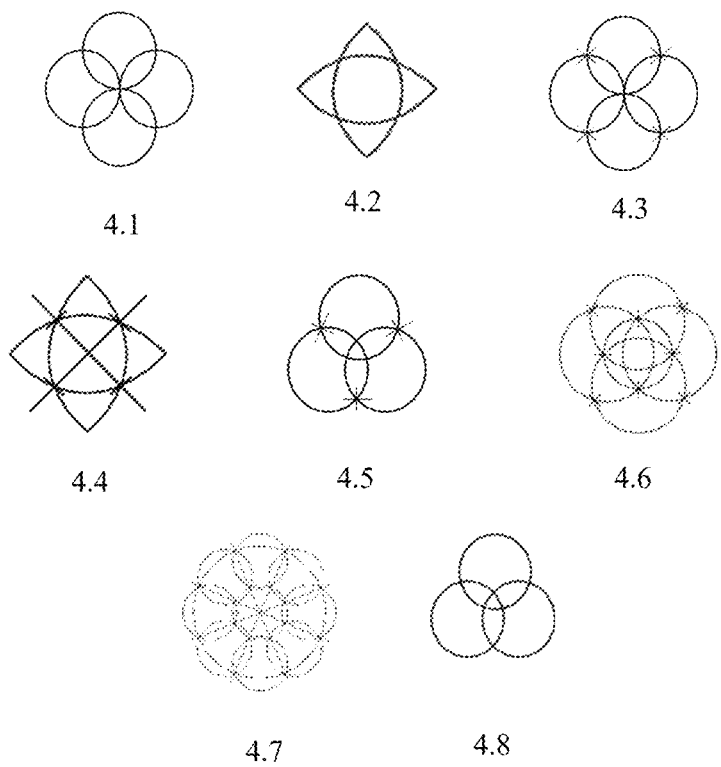
FIG. 4 shows examples of the pressure-releasing design according to the present invention.

According to the present invention, the pressure-releasing design 3 comprises the score of at least two identical or different patterns combined together such that no less than three intersections of the patterns are formed and at least one said pattern is a closed-shape pattern, as shown in FIG. 4 which illustrates the pressure-releasing design 4.1 to 4.8 which are preferred examples according to the present invention.

In a preferred aspect of the present invention, the pressure-releasing design 3 is formed of the score of at least two identical or different closed-shape patterns combined together. As an example, a closed-shape pattern may be selected from a group consisting of a circle, semi-circle, ellipse, semi-ellipse, pointed-end ellipse, pointed-end semi-ellipse, polygon or a combination thereof, as illustrated in FIG. 4, design 4.1, 4.2 and 4.8, for example.

In another preferred aspect of the present invention, the pressure-releasing design 3 is formed of the score of at least one closed-shape pattern and at least one open-shape pattern combined together. As an example, an open-shape pattern can be selected from a group consisting of a straight line, cross, asterisk, curved line, wavy line, V shape, T shape or a combination thereof, as illustrated in FIG. 4 design 4.3, 4.4, 4.5, 4.6 and 4.7, for example.

In a particular embodiment of the present invention, the pressure-releasing design 3 can be formed of the score of the pattern of at least two circles or ellipses or pointed-end ellipses combined together such that the intersections of the pattern are formed, creating 3-17 pressure-releasing points.

In another particular embodiment of the present invention, the pressure-releasing design 3 can be formed of the score of the pattern of at least one circle, ellipse or pointed-end ellipse combined with a cross pattern such that the intersections of the pattern are formed, creating 3-17 pressure-releasing points.

The pressure-releasing design 3 may be provided in one position, two positions or many positions on the external surface of the sealing part or on either side of the flexible film part.

According to the present invention, the pressure-releasing design 3 should have a diameter of the widest part ranging from 7 to 100%, preferably from 10 to 100%, relative to the diameter of the widest part of the flexible film part. According to a preferred embodiment, the score of the pattern has a depth that does not perforate the thickness of the flexible film part and has a depth starting from the external surface of the flexible film part in a range from 20 to 75%, relative to the thickness of the flexible film part.

According to the present invention, the score of the pattern may be formed by using a laser on the surface of the flexible film part. The laser is selected from fiber laser or $CO_2$ laser, preferably $CO_2$ laser.

In a particular aspect of the invention, the score of the pattern is formed by using $CO_2$ laser with a wavelength ranging from 300 to 17,000 nm, preferably from 9,300 to 10,700 nm, a laser power ranging from 1 to 30 watts, preferably from 10 to 20 watts, and a laser scan speed ranging from 6 to 720 m/min, preferably from 10 to 100 m/min.

A preferred example of the flexible film part according to the present invention is a laminated film comprising an inner layer film which is the layer in contact with the product contained in the package, and an outer layer film which is laminated to the inner layer film on the side that is not in contact with the product.

As an example, the inner layer film is made of polyolefin, preferably low density polyethylene, linear low density polyethylene, high density polyethylene, polypropylene homopolymer, polypropylene copolymer or a combination thereof. The outer layer film is made of polyamide, preferably biaxially-oriented polyamide (BOPA) or polyester, preferably biaxially-oriented polyethylene terephthalate (BOPET).

The inner layer film should have a thickness in a range of 40 to 100 μm, preferably in a range of 40 to 80 μm. The outer layer film should have a thickness in a range of 12 to 25 μm, preferably in a range of 12 to 15 μm.

The pressure-releasing design according to the present invention may be formed by using $CO_2$ laser on the outer layer film side to form the score of the pattern, wherein the thickness of the remaining laminated film in the score region of the pattern after using the $CO_2$ laser is in a range of 30 to 75 μm.

The package according to the present invention is suitable for using as a hermetically sealed package or a heatable hermetically sealed package for using with the microwave oven, in vacuum packing of products and/or as a package which can be subjected to disinfection by pasteurization or sterilization and/or as a package which can be used in a chilled or frozen condition.

The second embodiment of the present invention also relates to a pressure-releasing design for a flexible film having the aforementioned aspects.

Experiment

Sample Packages

A method for forming sample packages used in the pressure release efficiency test and various applications can be performed in several ways, depending on the aspects of the sample package to be tested. Following are the details which are exemplification.

In case the tested package is a center-sealed pouch, a sample film comprising an outer layer film made of nylon with 15 μm of thickness and an inner layer film made of linear low density polyethylene (LLDPE) with 60-80 μm of thickness is subjected to a laser application generated by a $CO_2$ laser maker to form a pressure-releasing design with different sizes and shapes on the external surface of the film. The film is inspected to ensure that there is no leakage. Then, the film having the pressure-releasing design is formed as a pouch package. A sponge containing 50 ml of water is put into said pouch. The pouch containing said sponge is then heated so that it is sealed hermetically.

In case the tested package is a stand-up pouch and a three-side sealed pouch, the sample film comprising an outer layer film made of nylon with 15 μm in thickness and an inner layer film made of LLDPE with 60-80 μm of thickness is subjected to a forming process to make a pouch. Then, the pouch is subjected to a laser application generated by a $CO_2$ laser maker to form a pressure-releasing design with different sizes and shapes on the external surface of the pouch. The pouch is inspected to ensure that there is no leakage. A sponge containing 50 ml of water is put into said pouch. The pouch containing said sponge is then heated so that it is sealed hermetically.

In case the tested package is a tray having a sealing portion made of a flexible film with a pressure-releasing design, a sample film comprising an outer layer film made of nylon with 15 μm of thickness and an inner layer film made of LLDPE with 60-80 μm of thickness is subjected to a laser application generated by a $CO_2$ laser maker to form a pressure-releasing design with different sizes and shapes on the external surface of the film. The film is inspected to ensure that there is no leakage. Then, the film having the pressure-releasing design is heated to seal it as a lid on the tray of the package, which has a sponge containing 50 ml of water therein, using a Multivac, TraysealerT100 at a sealing temperature of 190° C., 1 bar pressure for 3 seconds.

A number of various sample packages prepared above such as 10-30 samples are inspected for leakage and measured for the thickness of the remaining laminated film after the laser application by using a Keyence VHX-5000 microscope at 200-time magnification and tested for the pressure release by heating in a Panasonic NE-1753 microwave oven at 1300 watts for 60 seconds.

Evaluation of the Pressure Release Efficiency of the Packages

Three key factors to be considered in the evaluation of pressure release efficiency are as follows:
1. Pressure release of the packages: the test results are categorized into two sections with the criteria as follows:
   "good pressure release," which is the case where the package is able to form pressure-releasing points and release water vapor pressure in a timely manner which can be seen from the appearance of the package, e.g. the pouch or the sealing portion remains in a hermetically closed like before heating appearance (the results are reported in percentage of the number of packages with good pressure release compared to the total number of packages tested);
   "poor pressure release," which is the case where the package is able to form pressure-releasing points but unable to release the increasing pressure inside the package in a timely manner, resulting in an excessive pressure that acts on the package and cannot be released in a timely manner as the pressure-releasing points formed are too small. The film is therefore extended further such that a delamination or extended tear may occur in the region of the pressure-releasing design or any other regions of the package.
2. Delamination: the laminated film will be considered whether or not its bonding film is separated from each other after heating in the microwave oven (the results are reported in percentage of the number of packages with delamination compared to the total number of the packages tested).
3. Extended tear: the tearing will be considered whether or not it extends further from the end of the pressure-releasing design.

A Study on the Effect of Different Patterns on Pressure Release Efficiency

The tests were conducted using the methods described above. In this experiment, center-sealed pouch packages were formed of a film having the pressure-releasing design in one position and two positions on the external surface. The pressure-releasing design has a diameter of widest part of 12 mm and has different shapes which are a circle, cross, asterisk formed of three intersecting straight lines, and asterisk formed of four intersecting straight lines. The thicknesses of the remaining laminated film in the score region of the pattern that is remained after the laser application are similar which are about 40 µm. The results are shown in Table 1.

TABLE 1

Test results on pressure release

| Pressure-releasing design | One position of pressure-releasing design | | Two positions of pressure-releasing design | |
|---|---|---|---|---|
| | % of the number of pouches with good pressure release | % of the number of pouches with delamination | % of the number of pouches with good pressure release | % of the number of pouches with delamination |
| Circle (○) | 100 | 97 | 100 | 87 |
| Cross (+) | 80 | 57 | 97 | 57 |
| Asterisk formed of three intersecting straight lines (✶) | 100 | 40 | 100 | 37 |
| Asterisk formed of four intersecting straight lines (✶) | 100 | 60 | 100 | 27 |

From the test, it was found that the pouches having one position of pressure-releasing design were able to release the pressure but there was delamination. Particularly, the pressure-releasing design formed of the score of the pattern that is two intersecting straight lines (a cross) caused an extended tear from the end of the pressure-releasing design and an explosion of the pouches during heating in the microwave oven. Meanwhile, other pressure-releasing designs did not have the extended tearing and explosion problems.

Next, an additional experiment was performed using center-sealed pouch packages formed of a film having two positions of pressure-releasing design disposed away from each other along the longitudinal direction in the same center. The diameter of the widest part is 12 mm and the thickness of the remaining laminated film remained after the laser application is about 40 µm. The results show that an increase in the number of pressure-releasing design allowed the pouch to release the pressure inside more effectively as there were more pressure-releasing points and that the delamination was reduced in all pressure-releasing designs. However, although the increase in the number of pressure-releasing design enhances the pressure release efficiency and reduces the delamination, it still cannot eliminate delamination or make it occur less at an acceptable level.

In order to increase the pressure release efficiency and solve the delamination problem, an additional experiment was performed using 20×15 cm² stand-up pouches with a 4.5 cm folded portion having two positions of pressure-releasing design disposed away from each other along the longitudinal direction in the same center. The diameter of the widest part of the pressure-releasing design at both positions was 20 mm. The results are shown in Table 2.

TABLE 2

Test results on pressure release

| Pressure-releasing design | % of the number of pouches with good pressure release | % of the number of pouches with delamination |
|---|---|---|
| Asterisk formed of three intersecting straight lines (✶) | 97 | 0 |

TABLE 2-continued

| | Test results on pressure release | |
|---|---|---|
| Pressure-releasing design | % of the number of pouches with good pressure release | % of the number of pouches with delamination |
| Asterisk formed of four intersecting straight lines (✳) | 100 | 0 |

From the experiment, it was found that an increase in the size of the pressure-releasing design allowed the pouch packages to release the pressure more effectively and that there was no delamination as the increase in the size of the pressure-releasing design provided larger pressure-releasing points.

However, it was found that the pressure-releasing designs formed of the score of the pattern that is intersecting straight lines in Table 2 had a tear extending from the end of the pattern that is straight lines which could tear the pouch package if the pressure is not released in a timely manner.

The Pressure-Releasing Design According to the Invention

In order to solve the problems of the pressure not being released in a timely manner, delamination and extended tear mentioned above, an adjustment was made to the pressure-releasing design so that it consisted of closed-shaped patterns and more pattern intersections, as exemplified by the pressure-releasing design in FIG. 4, designs 4.1 to 4.4. In this experiment, 20×15 cm² stand-up pouches with a 4.5 cm folded portion were used, each pouch having different pressure-releasing design in one position. The results of the pressure release efficiency test are shown in Table 3.

TABLE 3

| | Test results on pressure release | |
|---|---|---|
| Pressure-releasing design | % of the number of pouches with good pressure release | % of the number of pouches with delamination |
| Design 4.1 | 100 | 10 |
| Design 4.2 | 100 | 0 |
| Design 4.3 | 100 | 0 |
| Design 4.4 | 100 | 0 |

From the experiment, it was found that the pressure-releasing design formed of the score of the pattern that is closed shapes (a circle and a pointed-end ellipse) combined together, according to design 4.1 and 4.2, and the pressure-releasing design formed of the score of the pattern that is closed shapes (a circle and a pointed-end ellipse) combined with the pattern that is open shape (a cross), according to design 4.3 and 4.4, could solve the extended tearing problem. Moreover, by increasing the number of pattern intersections of the pressure-releasing design, the position of the pressure-releasing point was increased as well, resulting in a better pressure release with no extended tear and delamination, or only 10% of delamination. Additionally, the pouch packages according to Table 3 have a good pressure release efficiency, despite having only one position of the pressure-releasing design, which provides an advantage in terms of production costs and a production process which can be controlled more easily, compared to the use of laser to form many positions of the pressure-releasing design. Also, in terms of user safety, as the position where the pressure-releasing points are formed has high-temperature water vapor pressure coming out therethrough, the larger number of pressure-releasing designs will further increase the risks that the users will be exposed to high-temperature steam while using the package.

A Study on the Effect of the Number of Pattern Intersection on Pressure Release Efficiency An additional experiment was performed to study the effect of the pattern intersection that forms the pressure-releasing points of different pressure-releasing designs of the present invention, compared to a comparative exemplary design. Center-sealed pouches having pressure releasing designs shown in FIG. 4, designs 4.5 to 4.7, and a design formed of the score of two partially overlapping circles which is the comparative example are used. The size of the pressure-releasing design is 10-15% of the maximum length of the pouch package. The results of the pressure release efficiency test are as shown in Table 4.

TABLE 4

| | | Number of intersections forming pressure-releasing points | Test results on pressure release | |
|---|---|---|---|---|
| Pressure-releasing design | Number of pattern intersections | | % of the number of pouches with good pressure release | % of the number of pouches with delamination |
| Design 4.5 | 6 | 3 | 100 | 0 |
| Design 4.6 | 12 | 8 | 100 | 0 |
| Design 4.7 | 17 | 17 | 100 | 0 |
| Two partially overlapping circles (◯◯) | 2 | 2 | 100 | 20 |

From Table 4, it was found that the pressure-releasing designs with intersections that are formed no less than three pressure-releasing points (designs 4.5 to 4.7) enabled the pouch to release the pressure effectively without delamination and extended problems, compared to the comparative example which is two partially overlapping circles which have only two pattern intersections with 20% of delamination.

Figure 6:
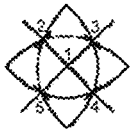
FIG. 6 is a Table of results from one study of the example pressure-releasing designs of FIG. 4.
Figure 6:
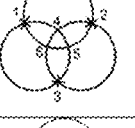
Figure 6:
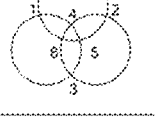

A Study on the Effect of the Pattern Intersections that Form the Pressure-Releasing Points on Pressure Release Efficiency A further study on the pattern intersection position that forms the pressure-releasing points was conducted by studying the pressure-releasing designs according to FIG. 4, designs 4.4, 4.5 and 4.8. The results are in the Table of FIG. 6.

From the study, it is found that, in case of the pressure-releasing design 4.4, the pressure-releasing points were only formed at the positions of intersection of the pattern formed of two circles or pointed-end ellipses and the pattern of at least one straight line intersecting each other. In other words, the pressure-releasing points were formed at positions 2, 3, 4 and 5. These positions where the pressure-releasing points were formed are the pattern intersection positions, wherein the thickness of the remaining laminated film after the laser application is lower than that of other pattern intersection positions. For example, in design 4.4, the positions where the pressure-releasing points were formed have similar thickness of laminated film ranging from 49 to 57 μm (positions 2, 3, 4 and 5), while the position where the pressure-releasing point was not formed (position 1) has a significantly greater film thickness than other intersection positions. When the pressure is formed inside the pouch while being heated in the microwave oven, the intersection positions with lower film thickness (lower strength) will expand and the pressure-releasing points are formed to release the pressure and steam from the pouch. Therefore, the remaining pressure inside the pouch is not sufficient to make the remaining intersection position (position 1) which has greater film thickness expand to form the pressure-releasing point. Moreover, increasing the number of scores of the pattern that is a straight line at the intersection promotes the formation of the pressure-releasing point as the score of the pattern that is a straight line helps to distribute the tension in the intersection region when the pressure is generated inside the pouch and provides similar film thickness in the score region of the pattern. The pressure-releasing point therefore can be formed more easily and efficiently.

Similarly, the formation mechanism of the pressure-releasing points of the pressure-releasing design 4.5, the pressure-releasing points are only formed at the intersection positions 1, 2 and 3.

For the pressure-releasing design 4.8 wherein there is no increase in the number of the score of the pattern that is a straight line or cross at the intersection position, the pressure-releasing points were formed randomly, i.e. the pressure-releasing points can be formed in any positions from 1 to 6 positions at intersection 1 to 6. The formation of the pressure-releasing points are therefore random and cannot be controlled.

A Study on the Effect of the Laser Application Conditions and the Remaining Film Thickness after the Laser Application An experiment was carried out by subjecting 20×15 cm² stand-up pouches with a 4.5 cm folded portion to the laser application to form the pressure-releasing designs 4.2 and 4.4. The laser application conditions which are laser power and laser scan speed were adjusted which would affect the laser marking time and the thickness of the remaining laminated film after the laser application in the score region of the pattern. The results are shown in Table 6.

TABLE 6

| Pressure-releasing design | Laser application condition | Film thickness remained after laser application (μm) | Test results on pressure release |
|---|---|---|---|
| Design 4.2 | laser power of 16 watts, laser scan speed of 30 m/min, and laser marking time of 0.19 seconds | 30-50 | Good pressure release |
| Design 4.2 | laser power of 16 watts, laser scan speed of 36 m/min, and laser marking time of 0.16 seconds | 55-65 | Poor pressure release with delamination |
| Design 4.2 | laser power of 16 watts, laser scan speed of 42 m/min, and laser marking time of 0.14 seconds | 70-80 | Poor pressure release with extended tearing |
| Design 4.4 | laser power of 16 watts, laser scan speed of 66 m/min, and laser marking time of 0.15 seconds | 35-45 | Good pressure release |
| Design 4.4 | laser power of 16 watts, laser scan speed of 72 m/min, and laser marking time of 0.14 seconds | 45-55 | Good pressure release |
| Design 4.4 | laser power of 16 watts, laser scan speed of 78 m/min, and laser marking time of 0.13 seconds | 65-70 | Good pressure release |
| Design 4.4 | laser power of 16 watts, laser scan speed of 84 m/min, and laser marking time of 0.12 seconds | 70-80 | Poor pressure release with extended tearing |

From the experiment, it was found that, in case of the pressure-releasing design 4.2, a suitable laser application condition which provided a good pressure release without causing delamination and extended tear is the laser power of 16 watts and laser scan speed of 30 m/min, which gives the thickness of the remaining laminated film after the laser application in the score region of the pattern in a range of 30 to 50 μm.

In case of the pressure-releasing design 4.4, suitable laser application conditions which provided a good pressure release without causing delamination and extended tear are the laser power of 16 watts and laser scan speed of 66 m/min, which gives the thickness of the remaining laminated film after the laser application in the score region of the pattern in a range of 35 to 45 μm, the laser power of 16 watts and laser scan speed of 72 m/min, which gives the thickness of the remaining laminated film after the laser application in the score region of the pattern in a range of 45 to 55 μm, and the laser power of 16 watts and laser scan speed of 78 m/min, which gives the thickness of the remaining laminated film after the laser application in the score region of the pattern in a range of 65 to 70 μm.

The above results showed that the pressure-releasing design according to the present invention could adopt the laser application conditions that provided less marking time and more thickness of the remaining laminated film after the laser application, which is more suitable for use because the greater of the remaining laminated film thickness after the laser application gives a water vapor and gas barrier property that is similar or not so different from that of the film which is not subjected to the laser application. The package therefore can be used to accommodate food without affecting the shelf life of the food in the package.

Moreover, by subjecting the pouch having the pressure-releasing design 4.4 to a test to determine the water vapor transmission rate (WVTR) at 37.8° C. and 90% relative humidity according to the ASTM F1249, and oxygen transmission rate (OTR) at 23° C. and 0% relative humidity according the ASTM D3985, when compared to the pouch made of a laminated film that is not subjected to the laser application, it was found that the pouch having the pressure-releasing design 4.4 has a water vapor transmission rate of 3.78 g/m²·day and oxygen transmission rate of 66.5 cc/m²·day, while the pouch that is not subjected to the laser application has a water vapor transmission rate of 4.39 g/m²·day and oxygen transmission rate of 52.4 cc/m²·day. The results show that the water vapor transmission rate and oxygen transmission rate of the pouch made of a laminated film subjected to the laser application to form the pressure-releasing design according to the invention are not significantly different from those of the pouch that is not subjected to the laser application and the pouch retains a good barrier property.

A Study on the Effect of the Size of the Pressure-Releasing Design

An experiment was carried out using 10×10 cm² (excluding the sealed area) center-sealed pouches having different size of the pressure-releasing design 4.4. The size of the pressure-releasing design is calculated from the diameter of the widest part of the design in percentage based on the maximum length of the pouch package. The results are shown in Table 7.

TABLE 7

| Size of pressure-releasing design (% per maximum length of pouch) | Test results on pressure release | |
|---|---|---|
| | % of the number of pouches with good pressure release | % of the number of pouches with delamination |
| 4 | 60 | 60 |
| 5 | 70 | 70 |
| 6 | 90 | 30 |
| 7 | 100 | 10 |
| 10 | 100 | 0 |
| 30 | 100 | 0 |
| 50 | 100 | 0 |
| 70 | 100 | 0 |
| 100 | 100 | 0 |

From the results, it was found that suitable pressure-releasing designs which enable a good pressure release with very low delamination (not more than 10%) and no extended tear are the pressure-releasing designs with diameters of the widest part more than or equal to 7%. The pressure-releasing designs which show the best results, which is no delamination or extended tear, are those with diameter of the widest part in a range of 10 to 100% based on the maximum length of the pouch package.

Next, an additional experiment on the effect of the size of the pressure-releasing design on pressure release efficiency was carried out using 20×15 cm² stand-up pouches having different sizes of pressure-releasing designs 4.3 and 4.4 and various ranges of remaining film thickness after the laser application. The results are shown in Table 8.

TABLE 8

| Pressure-releasing design | Size of pressure-releasing design | | Film thickness | Test results on pressure release | |
|---|---|---|---|---|---|
| | mm | % per maximum length of pouch | remained after laser application (μm) | % of the number of pouches with good pressure release | % of the number of pouches with delamination |
| Design 4.3 | 10 | 5 | 40-50 | 94 | 22 |
| | 20 | 10 | 60-70 | 100 | 0 |
| | 30 | 15 | 55-70 | 100 | 2 |
| | 40 | 20 | 55-65 | 100 | 0 |
| | 50 | 25 | 55-65 | 100 | 0 |
| | 60 | 30 | 55-65 | 100 | 0 |
| Design 4.4 | 10 | 5 | 45-55 | 96 | 52 |
| | 20 | 10 | 50-60 | 100 | 4 |
| | 30 | 15 | 50-60 | 100 | 0 |
| | 40 | 20 | 55-65 | 100 | 0 |
| | 50 | 25 | 65-75 | 100 | 0 |
| | 60 | 30 | 55-65 | 100 | 0 |

From Table 8, it can be seen that the preferred size of the pressure-releasing design and the remaining film thickness after the laser application that are suitable provide a good pressure release efficiency with no or very low percentage of delamination and extended tear.

A Study on the Position of the Pressure-Releasing Design on the Package Surface

Figure 5:
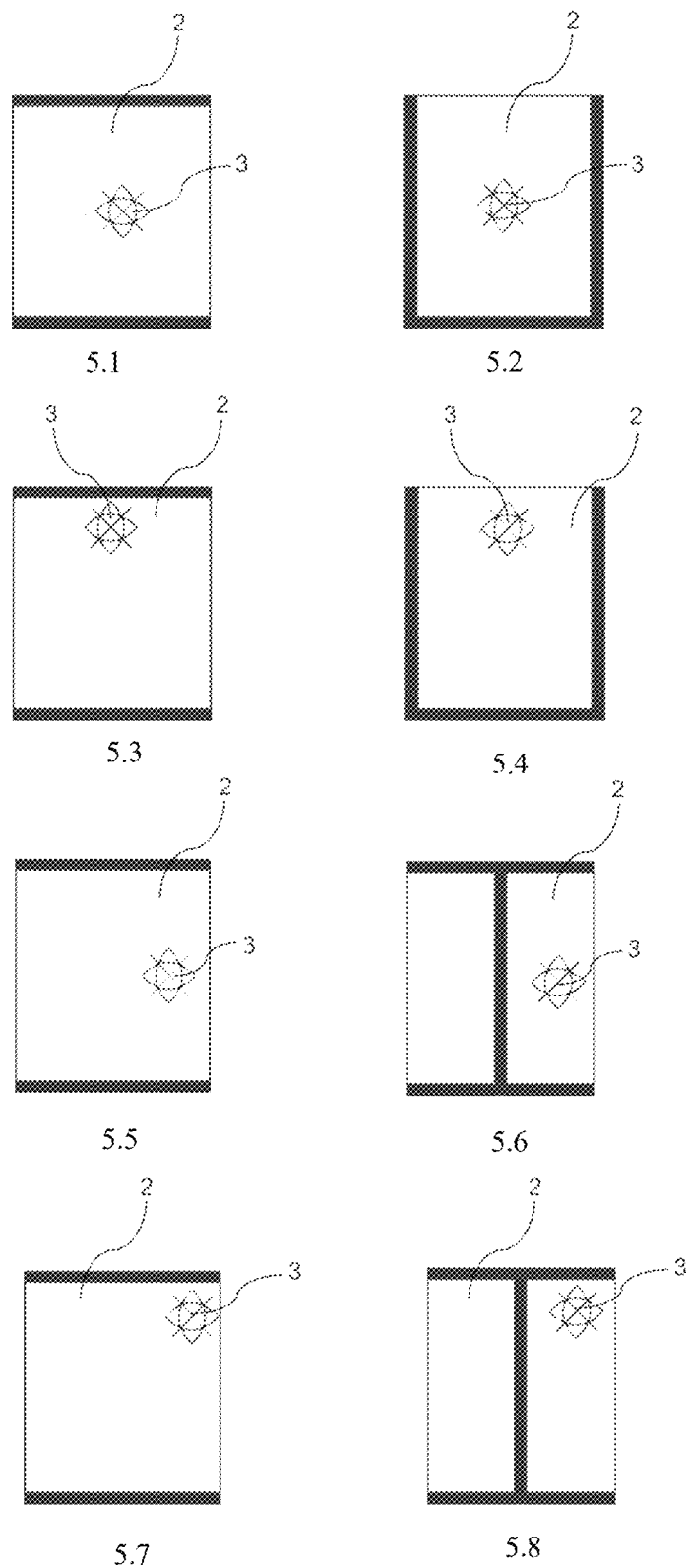
FIG. 5 shows examples of various position arrangements of the pressure-releasing design on packages according to the present invention.

An experiment was carried out using center-sealed and three-side sealed pouches having the pressure-releasing design 4.4 at different positions on the pouch package, as shown in FIG. 5, wherein the diameter of the widest part of the pressure-releasing design is 10%, relative to the maximum length of the pouch package. The results are shown in Table 9.

TABLE 9

| Figure | Package design | Position of pressure-releasing design | Test results on pressure release | |
|---|---|---|---|---|
| | | | % of the number of pouches with good pressure release | % of the number of pouches with delamination |
| 5.1 | Center-sealed pouch | At the center, at the front of the pouch | 100 | 0 |
| 5.2 | Three-side sealed pouch | At the center, at the back of the pouch | 100 | 0 |
| 5.3 | Center-sealed pouch | Near upper edge, at the front of the pouch | 100 | 0 |
| 5.4 | Three-side sealed pouch | Near upper edge, at the back of the pouch | 100 | 0 |
| 5.5 | Center-sealed pouch | Near lateral edge, at the front of the pouch | 100 | 0 |
| 5.6 | Center-sealed pouch | Near lateral edge, at the back of the pouch (the center-sealed area) | 100 | 0 |
| 5.7 | Center-sealed pouch | At a corner, at the front of the pouch | 100 | 0 |
| 5.8 | Center-sealed pouch | At a corner, at the back of the pouch (the center-sealed area) | 100 | 0 |

From Table 9, it can be seen that the position of the pressure-releasing design can be anywhere on various pouch packages without affecting the pressure release efficiency or causing delamination and extended tearing problems.

A Study on the Use of the Package as a Vacuum Package

An experiment was carried out using a center-sealed pouch having the pressure-releasing design 4.4 with a sponge containing 50 ml of water therein according to the method described above.

During the sealing step, the air inside the pouch was removed to simulate a vacuum packaging condition. The pouch sample was then kept at room temperature for 6 months before testing its ability to release the pressure by heating in the microwave oven.

The results show that the pouch package having the pressure-releasing design 4.4 according to the present invention can be used as a vacuum package as the pouch package can still retain the vacuum condition after the room-temperature storage and release the pressure effectively with no delamination and extended tear upon heating in the microwave oven.

A Study on the Use of the Package as a Vacuum Package which is Subjected to Disinfection An experiment was carried out using a center-sealed pouch having the pressure-releasing design 4.4 with a sponge containing 50 ml of water therein according to the method described above. During the sealing step, the air inside the pouch was removed to simulate a vacuum packaging condition. The pouch sample was then subjected to disinfection at 90° C. for 25 minutes in a Waterspray Overpressure Retort (KM Grand Pack Co., Ltd, KM-P60SS-E). The disinfected vacuum pouch package was kept at room temperature for two weeks before testing its ability to release the pressure by heating in the microwave oven.

The results show that the pouch package having the pressure-releasing design 4.4 according to the present invention can be used as a vacuum package and subjected to disinfection as the pouch package can still retain the condition of a hermetically sealed vacuum package after the disinfection and room-temperature storage and release the pressure effectively with no delamination and extended tear upon heating in the microwave oven.

A Study on the Use of the Package as a Vacuum Package which is Subjected to Disinfection and Stored in a Frozen Condition An experiment was carried out using a center-sealed pouch having the pressure-releasing design 4.4 with a sponge containing 50 ml of water therein according to the method described above. During the sealing step, the air inside the pouch was removed to simulate the vacuum packaging condition. The pouch sample was then subjected to disinfection at 90° C. for 25 minutes in the Waterspray Overpressure Retort. The pouch package was then kept in a frozen condition at −18° C. for 2 weeks before testing its ability to release the pressure by heating in the microwave oven.

The results show that the pouch package having the pressure-releasing design 4.4 according to the present invention can be used as a vacuum package and subjected to disinfection as the pouch package can still retain the condition of a hermetically sealed vacuum package after the disinfection and frozen storage (−18° C.) and release the pressure effectively with no delamination and extended tear upon heating in the microwave oven.

BEST MODE OF THE INVENTION

Best mode of the invention is as described in the detailed description of the invention.

The invention claimed is:

1. A package capable of releasing pressure formed therein, said package comprising:
a container portion which is formed for accommodating product, and a flexible film part comprising at least one pressure-releasing design on an external surface of said part, wherein said pressure-releasing design comprises a score of at least two identical or different patterns combined together such that no less than three intersections of the patterns are formed and at least one said pattern is a closed-shape pattern.

2. The package according to claim 1, wherein the pressure-releasing design is formed of the score of at least two identical or different closed-shape patterns combined together.

3. The package according to claim 1, wherein the pressure-releasing design is formed of the score of at least one closed-shape pattern and at least one open-shape pattern combined together.

4. The package according to claim 1, wherein the closed-shaped pattern is selected from a group consisting of a circle, semi-circle, ellipse, semi-ellipse, pointed-end ellipse, pointed-end semi-ellipse, polygon or a combination thereof.

5. The package according to claim 3, wherein the open-shape pattern is selected from a group consisting of a straight line, cross, asterisk, curved line, wavy line, V shape, T shape or a combination thereof.

6. The package according to claim 1, wherein the pressure-releasing design is formed of the score of the pattern of at least two circles, ellipses or pointed-end ellipses combined together such that the intersections of the pattern are formed, creating 3-17 pressure-releasing points.

7. The package according to claim 1, wherein the pressure-releasing design is formed of the score of the pattern of at least one circle, ellipse or pointed-end ellipse combined with a cross pattern such that the intersections of the pattern are formed, creating 3-17 pressure-releasing points.

8. The package according to claim 1, wherein the score of the pattern has a depth that does not perforate the thickness of the flexible film part.

9. The package according to claim 8, wherein the score of the pattern has a depth starting from the outer surface of the flexible film part in a range from 20 to 75%, relative to the thickness of the flexible film part.

10. The package according to claim 1, wherein the pressure-releasing design has a diameter of the widest part ranging from 7 to 100% relative to the diameter of the widest part of the flexible film part.

11. The package according to claim 1, wherein the score of the pattern is formed by using a laser on the surface of the flexible film part.

12. The package according to claim 11, wherein the laser is selected from fiber laser or CO2 laser.

13. The package according to claim 11, wherein the score of the pattern is formed by using a CO2 laser with a wavelength ranging from 300 to 17,000 nm a laser power ranging from 1 to 30 watts and a laser scan speed ranging from 6 to 720 m/min.

14. The package according to claim 1, wherein the flexible film part is a laminated film comprising an inner layer film which is the layer in contact with a product contained in the package, and an outer layer film which is laminated to the inner layer film on the side that is not in contact with the product.

15. The package according to claim 14, wherein the inner layer film is made of polyolefin, low density polyethylene, linear low density polyethylene, high density polyethylene, polypropylene homopolymer, polypropylene copolymer or a combination thereof.

16. The package according to claim 14, wherein the outer layer film is made of polyamide, biaxially-oriented polyamide (BOPA) or polyester, preferably biaxially-oriented polyethylene terephthalate (BOPET).

17. The package according to claim 14, wherein the inner layer film has a thickness in a range of 40 to 100 μm.

18. The package according to claim 14, wherein the outer layer film has a thickness in a range of 12 to 25 μm.

19. The package according to claim 14, wherein the laminated film has the pressure-releasing design formed by using the CO2 laser on the outer layer film side to form the score of the pattern wherein the thickness of the remaining laminated film in the score region of the pattern after using the CO2 laser is in a range of 30 to 75 μm.

20. The package according to claim 1, which is a hermetically sealed package or heatable hermetically sealed package for using with a microwave oven.

21. The package according to claim 20, which is a pouch made of the flexible film having the pressure-releasing design on the external surface of said pouch.

22. The package according to claim 20 comprising a tray container portion and a sealing portion that is the flexible film having the pressure-releasing design on the external surface of said sealing portion.

23. The package according to claim 20 for vacuum packing of products.

24. The package according to claim 20, which is the package that can be subjected to disinfection by pasteurization or sterilization.

25. The package according to claim 20, which can be used in a chilled or frozen condition.

26. A flexible film comprising a pressure-releasing design wherein said pressure-releasing design comprises a score of at least two identical or different patterns combined together such that no less than three intersections of the patterns are formed and at least one said pattern is a closed-shape pattern.

27. The flexible film according to claim 26, which is formed of the score of at least two identical or different closed-shape patterns combined together.

28. The flexible film according to claim 26, which is formed of the score of at least one closed-shape pattern and at least one open-shape pattern combined together.

29. The flexible film according to claim 26, wherein the closed-shape pattern is selected from a group consisting of circle, semi-circle, ellipse, semi-ellipse, pointed-end ellipse, pointed-end semi-ellipse, polygon or a combination thereof.

30. The flexible film according to claim 28, wherein the open-shape pattern is selected from a group consisting of straight line, cross, asterisk, curved line, wavy line, V shape, T shape or a combination thereof.

31. The flexible film according to claim 26, which is formed of the score of the pattern of at least two circles, ellipses or pointed-end ellipses combined together such that the intersections of the pattern are formed, creating 3-17 pressure-releasing points.

32. The flexible film according to claim 26, which is formed of the score of the pattern of at least one circle, ellipse or pointed-end ellipse combined with a cross pattern such that the intersections of the pattern are formed, creating 3-17 pressure-releasing points.

33. The flexible film according to, claim 26, wherein the score of the pattern has a depth that does not perforate the thickness of the flexible film.

34. The flexible film according to claim 33, wherein the score of the pattern has a depth starting from the surface of the flexible film in a range from 20 to 75%, relative to the thickness of the flexible film.

35. The flexible film according to claim 26, which has a diameter of the widest part in a range from 7 to 100% relative to the diameter of the widest part of the flexible film.

36. The flexible film according to, claim 26, wherein the score of the pattern is formed by using a laser on the surface of the flexible film.

37. The flexible film according to claim 36, wherein the laser is selected from fiber laser or CO2 laser.

38. The flexible film according to claim 36, wherein the score of the pattern is formed by using a CO2 laser with a wavelength ranging from 300 to 17,000 nm, a laser power ranging from 1 to 30 watts, and a laser scan speed ranging from 6 to 720 m/min.

39. The flexible film according to claim 26, wherein the flexible film is a laminated film for making a package, said laminated film comprising an inner layer film which is the layer in contact with a product contained in the package, and an outer layer film which is laminated to the inner layer film on the side that is not in contact with the product.

40. The flexible film according to claim 39, wherein the inner layer film is made of polyolefin, low density polyethylene, linear low density polyethylene, high density polyethylene, polypropylene homopolymer, polypropylene copolymer or a combination thereof.

41. The flexible film according to claim 39, wherein the outer layer film is made of polyamide, biaxially-oriented polyamide (BOPA) or polyester, preferably biaxially-oriented polyethylene terephthalate (BOPET).

42. The flexible film according to claim 39, wherein the inner layer film has a thickness in a range of 40 to 100 μm.

43. The flexible film according to claim 39, wherein the outer layer film has a thickness in a range of 12 to 25 μm.

44. The flexible film according to claim 39, which is formed by using a CO2 laser on the outer layer film side to form the score of the pattern, wherein the thickness of the remaining laminated film in the score region of the pattern after using the CO2 laser is in a range of 30 to 75 μm.

45. The flexible film according to claim 26 for using with a hermetically sealed package or heatable hermetically sealed package for using with a microwave oven.

46. The flexible film according to claim 45, wherein the package is a pouch made of a flexible film having the pressure-releasing design on the external surface of said pouch.

47. The flexible film according to claim 45, wherein the package comprises a tray container portion and a sealing portion that is the flexible film having the pressure-releasing design on the external surface of said sealing portion.

48. The flexible film according to claim 45, wherein the package is used for vacuum packing of products.

49. The flexible film according to claim 45, wherein the package can be subjected to disinfection by pasteurization or sterilization.

50. The flexible film claim 45, wherein the package can be used in a chilled or frozen condition.

* * * * *